US012587278B2

(12) United States Patent  
Hara

(10) Patent No.: US 12,587,278 B2  
(45) Date of Patent: Mar. 24, 2026

(54) OPTICAL RECEIVER, OPTICAL TRANSMITTER, AND OPTICAL RECEPTION METHOD

(71) Applicant: NEC Corporation, Tokyo (JP)

(72) Inventor: Yasushi Hara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 18/200,063

(22) Filed: May 22, 2023

(65) Prior Publication Data

US 2024/0113777 A1    Apr. 4, 2024

(30) Foreign Application Priority Data

Sep. 29, 2022    (JP) ................................. 2022-156568

(51) Int. Cl.  
*H04B 10/60*        (2013.01)  
*H04B 10/079*      (2013.01)

(52) U.S. Cl.  
CPC . *H04B 10/07955* (2013.01); *H04B 10/07953* (2013.01); *H04B 10/60* (2013.01)

(58) Field of Classification Search  
CPC ........ H04B 10/07955; H04B 10/07953; H04B 10/60; H04B 10/102543  
See application file for complete search history.

(56) References Cited

U.S. PATENT DOCUMENTS

| | | | | |
|---|---|---|---|---|
| 6,081,360 | A * | 6/2000 | Ishikawa ............ | H04B 10/2519 |
| | | | | 398/1 |
| 6,735,725 | B1 * | 5/2004 | Wu ...................... | H04J 14/0221 |
| | | | | 714/704 |
| 7,224,906 | B2 * | 5/2007 | Cho ...................... | H04J 14/005 |
| | | | | 398/189 |
| 11,671,174 | B1 * | 6/2023 | Jiang .................... | H04B 10/564 |
| | | | | 398/27 |
| 2007/0104491 | A1 * | 5/2007 | Hainberger ........ | H04B 10/2942 |
| | | | | 398/175 |
| 2012/0230680 | A1 * | 9/2012 | Fujita .................. | H04J 14/0271 |
| | | | | 398/25 |
| 2016/0344481 | A1 * | 11/2016 | Vassilieva ......... | H04J 14/02216 |
| 2017/0078027 | A1 * | 3/2017 | Okabe .................... | H04B 10/58 |
| 2018/0034551 | A1 * | 2/2018 | Nishihara ............ | H04B 10/588 |
| 2023/0024263 | A1 * | 1/2023 | Watanabe ............ | H04B 10/572 |
| 2025/0132829 | A1 * | 4/2025 | Sone .................. | H04B 10/2543 |

FOREIGN PATENT DOCUMENTS

JP        2012-105167 A      5/2012

* cited by examiner

*Primary Examiner* — Tanya T Motsinger  
(74) *Attorney, Agent, or Firm* — Sughrue Mion, PLLC

(57)        ABSTRACT

In order to detect occurrence of an influence on quality of an optical signal due to a non-linear effect of an optical fiber, an optical receiver includes: a demodulation unit that demodulates a received optical signal and outputs a reception signal, and calculates a quality value indicating quality of the optical signal; an extraction unit that extracts, from the reception signal, transmission power being a value indicating optical power at a time of transmitting the optical signal; an arithmetic unit that determines a change rate of the quality value to the transmission power; and a monitoring unit that determines, based on a comparison result between the change rate and a predetermined threshold, an influence of a non-linear effect in the optical signal.

12 Claims, 11 Drawing Sheets

OPTICAL RECEIVER, OPTICAL TRANSMITTER, AND OPTICAL RECEPTION METHOD

This application is based upon and claims the benefit of priority from Japanese Patent Application No. 2022-156568, filed on Sep. 29, 2022, the disclosure of which is incorporated herein in its entirety by reference.

TECHNICAL FIELD

The present disclosure relates to an optical transmission system and the like.

BACKGROUND ART

In an optical transmission system using an optical fiber, generally, when optical power of an optical signal is high, an optical signal to noise ratio (OSNR) also increases. Therefore, usually, as optical power at a time of reception is higher, signal quality also increases. Therefore, in order to increase signal quality, optical power at a time of transmitting an optical signal is desirably high. As an indicator of signal quality, a bit error rate (BER) or a quality factor (Q-value) is used. The Q-value is a value that can be determined from the BER by using a known procedure.

However, in a long-distance optical transmission system, as optical power at a time of transmission is higher, an influence of a non-linear effect of an optical fiber increases. As a result, it is known that, as optical power of an optical signal propagating through an optical fiber is made higher, quality of a received optical signal turns to decrease.

In relation to the present disclosure, Japanese Unexamined Patent Application Publication No. 2012-105167 (Patent Literature (PTL) 1) describes a WDM device that performs, based on a BER or a Q-value, pre-emphasis control.

SUMMARY

As described above, when optical power of an optical signal propagating through an optical fiber increases, quality of the optical signal gradually decreases due to an influence of a non-linear effect of the optical fiber. In other words, in a long-distance optical transmission system, with regard to optical power at a time of transmitting an optical signal, a value as a peak at which signal quality at a time of reception turns from rising to falling is present. When optical power of the optical signal exceeds the value, signal quality of the optical signal further decreases due to a non-linear effect. Therefore, it is expected that presence/absence of an influence on signal quality due to a non-linear effect of the optical fiber is detectable at a time of transmitting the optical signal.

Object of the Disclosure

An exemplary object of the disclosure is to provide, in an optical transmission system, a technique for detecting occurrence of an influence on quality of an optical signal due to a non-linear effect of an optical fiber.

An optical receiver according to an exemplary embodiment of the present disclosure includes:

a demodulation unit for demodulating a received optical signal, outputting a reception signal, and calculating a quality value indicating quality of the optical signal;

an extraction unit for extracting, from the reception signal, transmission power being a value indicating optical power at a time of transmitting the optical signal;

an arithmetic unit for determining a change rate of the quality value to the transmission power; and a monitoring unit for determining, based on a comparison result between the change rate and a predetermined threshold, an influence of a non-linear effect in the optical signal.

An optical transmitter according to an exemplary embodiment of the present disclosure includes:

a transmission signal generation unit for outputting a transmission signal being an electric signal including transmission power being a value indicating power at a time of transmitting an optical signal;

an optical modulation unit for modulating the transmission signal and outputting the optical signal;

an optical intensity adjustment unit for adjusting intensity of the optical signal; and a control unit for outputting the transmission power to the transmission signal generation unit and controlling the optical intensity adjustment unit in such a way that power of the optical signal being output from the optical intensity adjustment unit is the transmission power.

An optical reception method according to an exemplary embodiment of the present disclosure includes a procedure of:

demodulating a received optical signal and outputting a reception signal;

calculating a quality value indicating quality of the optical signal;

extracting, from the reception signal, transmission power being a value indicating optical power at a time of transmitting the optical signal;

determining a change rate of the quality value to the transmission power; and determining, based on a comparison result between the change rate and a predetermined threshold, an influence of a non-linear effect in the optical signal.

An optical transmission method according to an exemplary embodiment of the present disclosure includes a procedure of:

outputting, from a transmission signal generation unit, a transmission signal being an electric signal including transmission power being a value indicating power at a time of transmitting an optical signal;

modulating the transmission signal and outputting the optical signal;

outputting the transmission power to the transmission signal generation unit; and adjusting power of the optical signal in such a way that power of the optical signal is the transmission power.

Advantageous Effects of Disclosure

The present disclosure enables detecting occurrence of an influence on quality of an optical signal due to a non-linear effect of an optical fiber.

BRIEF DESCRIPTION OF THE DRAWINGS

Exemplary features and advantages of the present disclosure will become apparent from the following detailed description when taken with the accompanying drawings in which.

EXAMPLE EMBODIMENT

Figure 1:
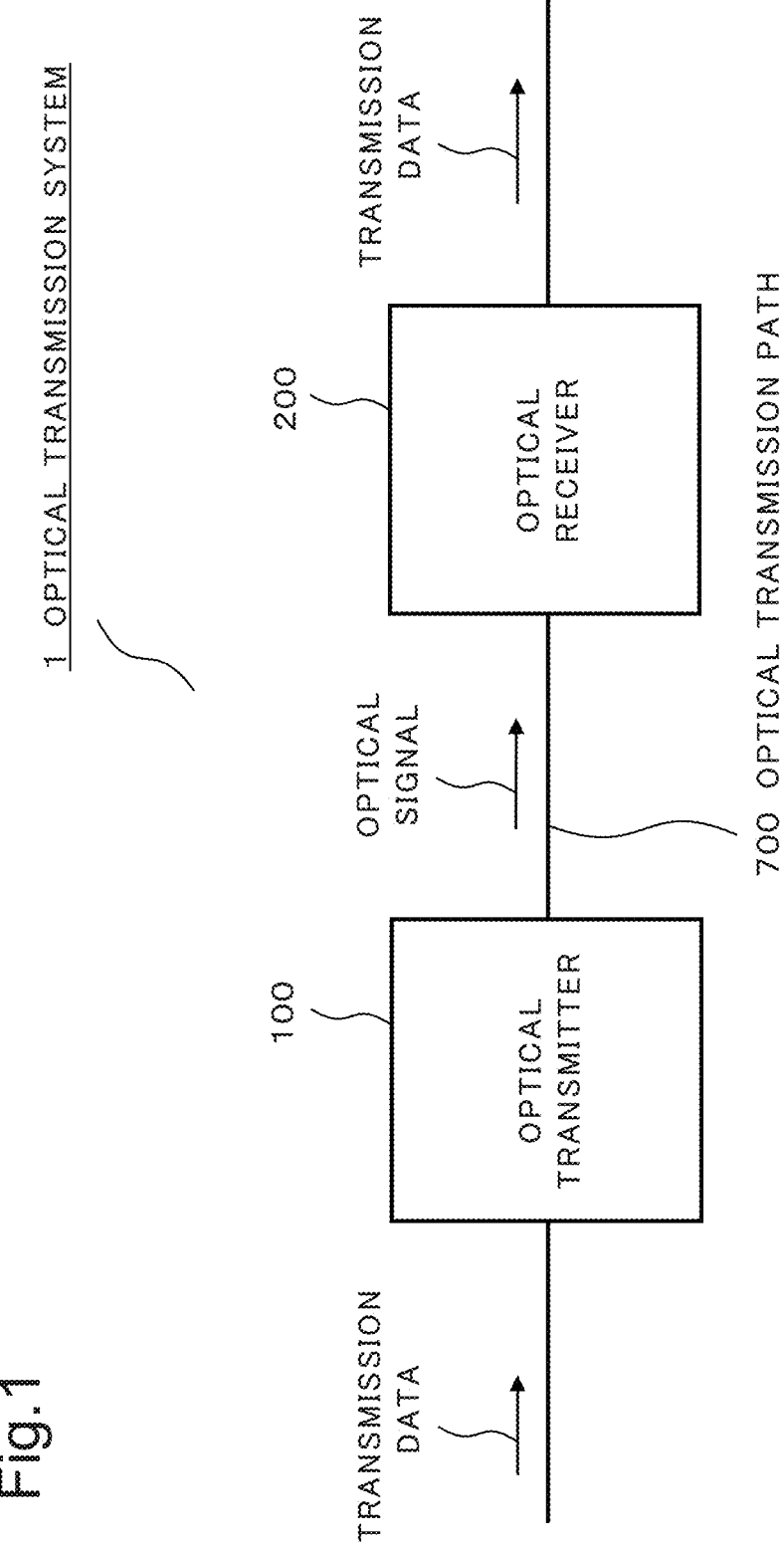
FIG. 1 is a block diagram illustrating a configuration example of an optical transmission system.

Example embodiments according to the present disclosure are described below with reference to the accompanying drawings. Each arrow illustrated in the drawings exemplarily indicate a direction of a signal and are not intended to limit this matter. According to the example embodiments and drawings, a previously-described element is assigned with the same reference sign and overlapping description may be omitted.

First Example Embodiment

FIG. 1 is a block diagram illustrating a configuration example of an optical transmission system 1 according to a first example embodiment of the present disclosure. The optical transmission system 1 includes an optical transmitter 100, an optical receiver 200, and an optical transmission path 700. The optical transmitter 100 generates an optical signal including transmission data being input from an outside of the optical transmitter 100 and transmits the optical signal to the optical transmission path 700. The optical transmission path is an optical fiber, and the optical signal is transmitted by the optical transmission path 700 from the optical transmitter 100 to the optical receiver 200. The optical receiver 200 demodulates data such as transmission data included in a received optical signal and outputs the demodulated transmission data to an outside of the optical receiver 200.

Figure 2:
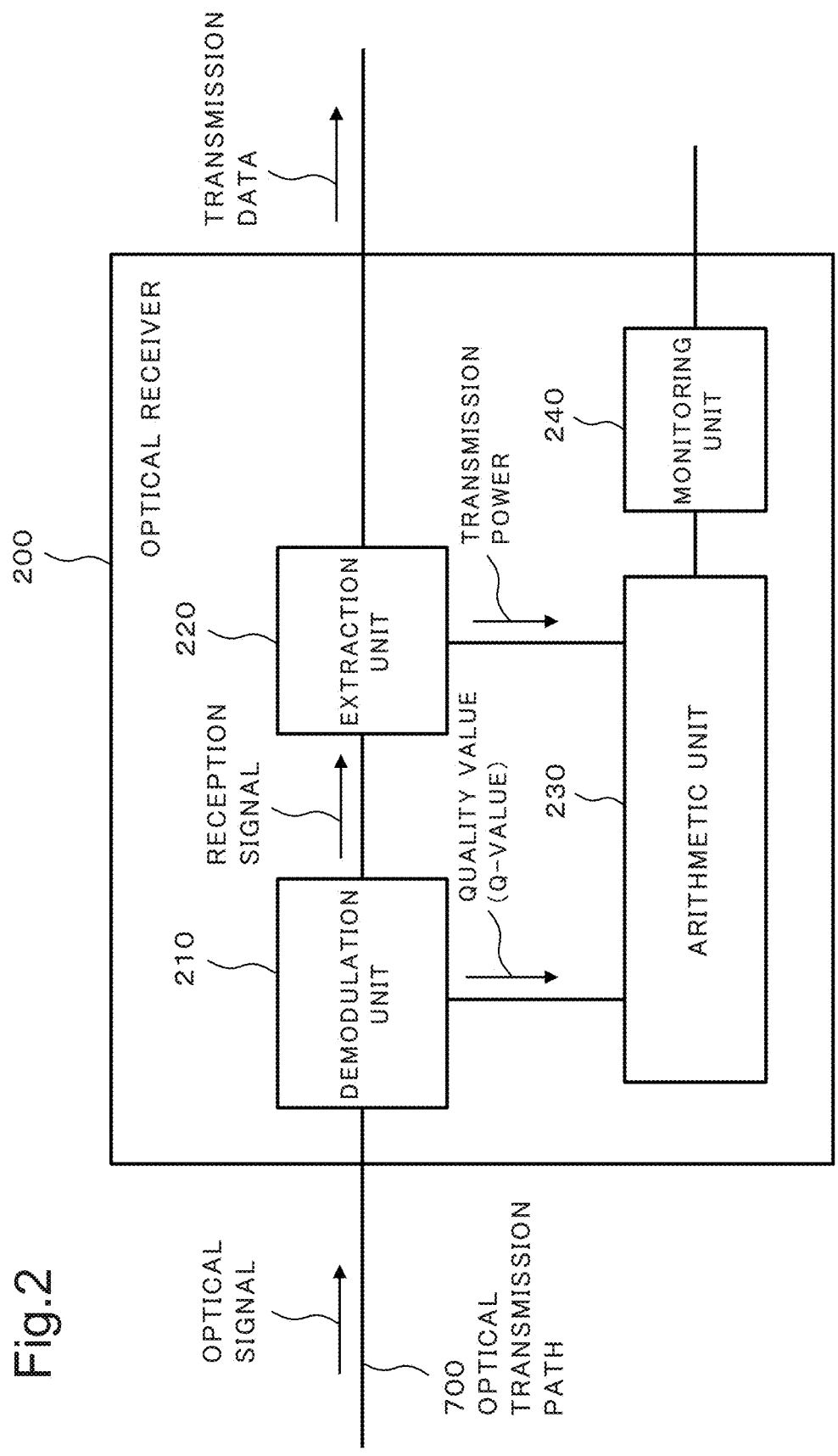
FIG. 2 is a block diagram illustrating a configuration example of an optical receiver.

FIG. 2 is a block diagram illustrating a configuration example of the optical receiver 200. The optical receiver 200 includes a demodulation unit 210, an extraction unit 220, an arithmetic unit 230, and a monitoring unit 240.

The demodulation unit 210 receives an optical signal from the optical transmission path 700, demodulates the received optical signal, and outputs a reception signal. The reception signal is a digital electric signal. The demodulation unit 210 calculates a quality value indicating quality of the received optical signal. As the quality value, a Q-value is usable. The Q-value is one of quality indicators for an optical signal generally used in an optical fiber transmission system and is determined, for example, from a bit error rate (BER) of a reception signal. The demodulation unit 210 may include a function of calculating a BER of a reception signal and a function of determining a Q-value by using the calculated BER. The quality value is output to the arithmetic unit 230. The demodulation unit 210 is one mode of the demodulation means.

The reception signal includes transmission data and transmission power data. The transmission data are user data transmitted by the optical transmission system 1. The transmission power data are data including information of transmission power of a received optical signal. The transmission power is a value of optical power at a time of transmitting an optical signal in the optical transmitter 100. The extraction unit 220 extracts, from a reception signal, transmission data and transmission power. The transmission data are output to an outside of the optical receiver 200, and the transmission power is output to the arithmetic unit 230. The extraction unit 220 is one mode of the extraction means.

The arithmetic unit 230 determines, by using a quality value calculated by the demodulation unit 210 and transmission power extracted by the extraction unit 220, a change rate of the quality value to the transmission power. The arithmetic unit 230 acquires, from the demodulation unit 210, for example, a first quality value being a quality value in first transmission power and a second quality value being a quality value in second transmission power different from the first transmission power. The arithmetic unit 230 further calculates, from the transmission power in these quality values, a change rate of a quality value to transmission power of an optical signal. The arithmetic unit 230 can be referred to as the arithmetic means.

The monitoring unit 240 determines, based on a change rate of a quality value, whether an optical signal is affected by a non-linear effect when propagating through the optical transmission path 700. When optical power of the optical signal propagating through the optical transmission path 700 increases to a value equal to or more than a certain degree, due to an influence of a non-linear effect of an optical fiber, quality of the optical signal gradually decreases. Therefore, the monitoring unit 240 compares quality values of optical signals in different pieces of transmission power. The monitoring unit 240 determines that an optical signal is being affected by a non-linear effect when a degree of improvement of quality is smaller than a predetermined threshold in a case of higher transmission power. In other words, the monitoring unit 240 compares a change rate of the quality value determined in the arithmetic unit 230 with a predetermined threshold and determines, based on the comparison result, an optical signal is affected by a non-linear effect. For example, when a change rate of a Q-value to transmission power, which is calculated by the arithmetic unit 230, is smaller than a predetermined threshold, the monitoring unit 240 determines that an optical signal is being affected by a non-linear effect. The reason is that under an influence of a non-linear effect, a degree of improvement of a quality value with respect to an increase in transmission power decreases. A desirable predetermined threshold may be determined by previously actually measuring a relation between a change rate of a Q-value and a quality value. The monitoring unit 240 is one mode of the monitoring means.

The optical receiver 200 including such a configuration can detect occurrence of an influence due to a non-linear effect of an optical fiber. The reason is that the optical receiver 200 compares a change rate of a quality value to transmission power of an optical signal with a threshold and determines presence/absence of an influence on quality of the optical signal due to a non-linear effect.

Second Example Embodiment

Figure 3:
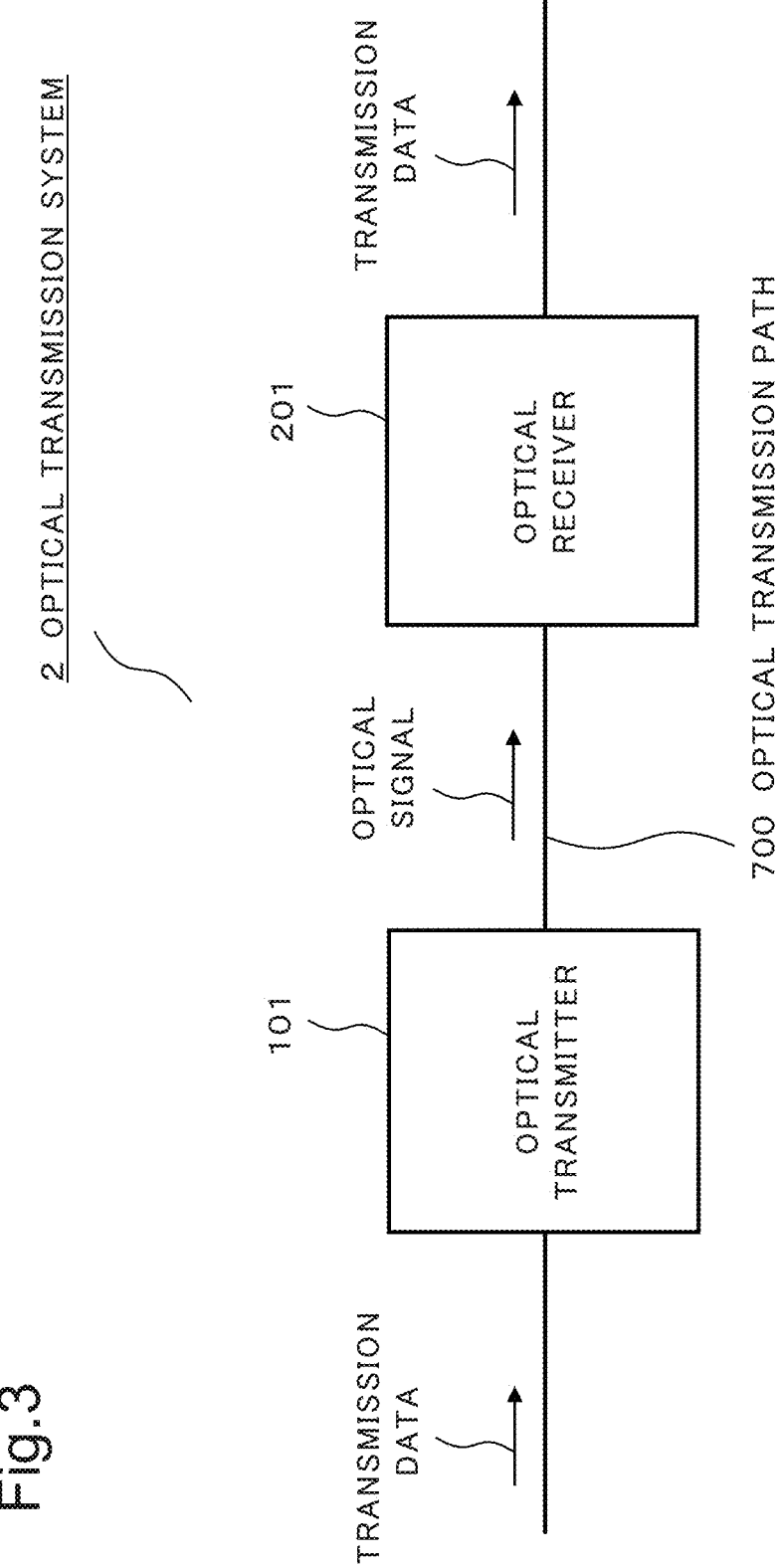
FIG. 3 is a block diagram illustrating a configuration example of an optical transmission system.

FIG. 3 is a block diagram illustrating a configuration example of an optical transmission system 2 according to a second example embodiment of the present disclosure. The optical transmission system 2 includes an optical transmitter 101, an optical receiver 201, and an optical transmission path 700. The optical transmitter 101 generates an optical signal including transmission data and transmits the generated optical signal to the optical transmission path 700. The optical transmission path is an optical fiber, and the optical signal is transmitted by the optical transmission path 700 from the optical transmitter 101 to the optical receiver 201. The optical receiver 201 demodulates data such as transmission data included in the received optical signal and outputs the demodulated transmission data.

Figure 4:
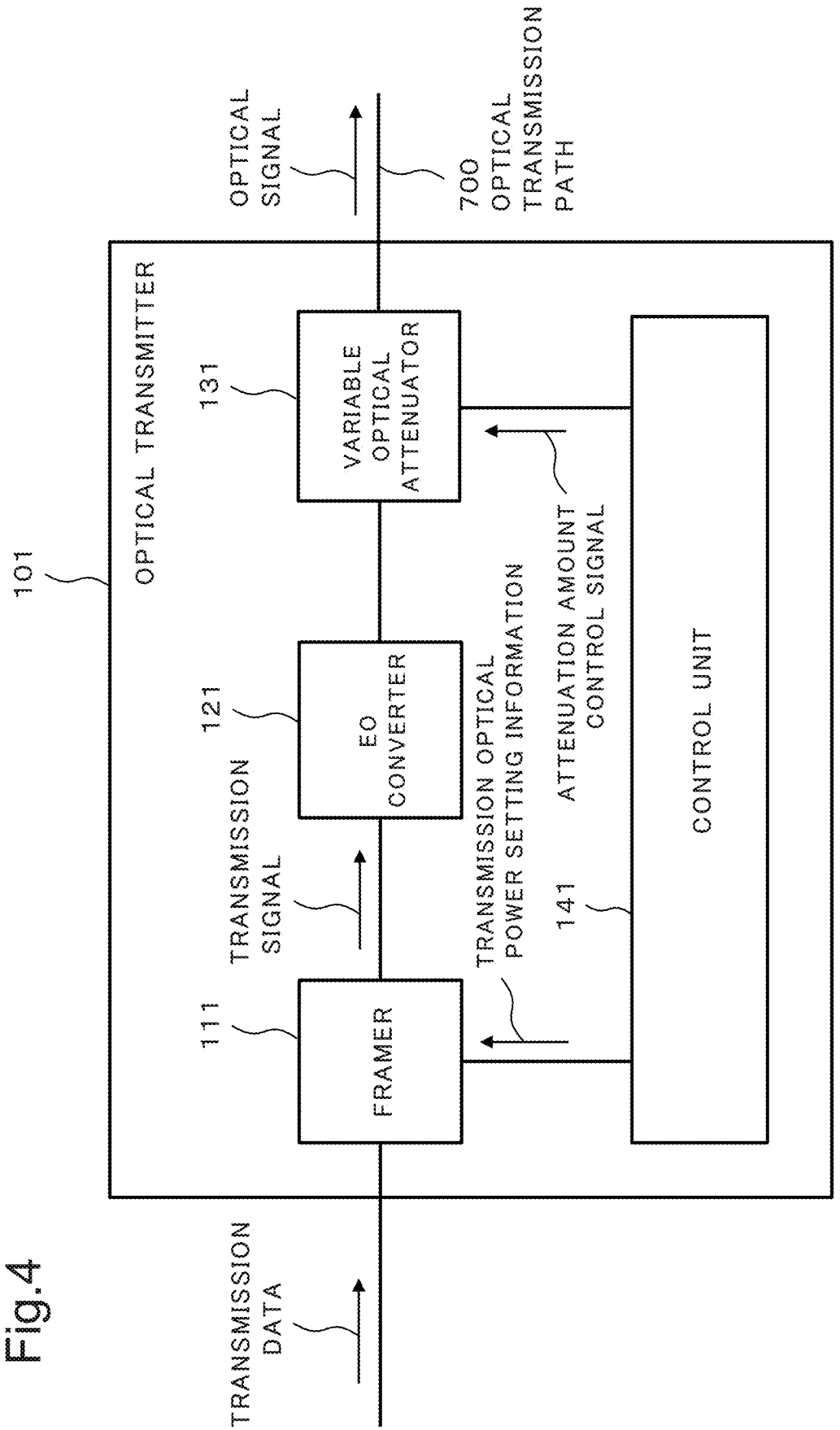
FIG. 4 is a block diagram illustrating a configuration example of an optical transmitter.

FIG. 4 is a block diagram illustrating a configuration example of the optical transmitter 101. The optical transmitter 101 includes a framer 111, an electro-optic (EO) converter 121, a variable optical attenuator 131, and a control unit 141.

The framer 111 stores transmission data and overhead data in a frame having a predetermined configuration and generates a transmission signal. The transmission signal being output from the framer 111 is input to the EO converter 121. The framer 111 is one mode of the transmission signal generation means. The EO converter 121 modulates, based on a transmission signal, an optical carrier and generates an optical signal. The EO converter 121 may have a known configuration including a light source for generating an optical carrier and an optical modulator. The EO converter 121 is one mode of the optical modulation means.

The variable optical attenuator 131 applies predetermined attenuation to an optical signal being input from the EO converter 121. An attenuation amount of the variable optical attenuator 131 is set in such a way that optical power (transmission power) of an optical signal being output from the optical transmitter 101 has a predetermined value. The variable optical attenuator 131 is one mode of the optical intensity adjustment means for adjusting intensity of an optical signal.

The control unit 141 controls units of the optical transmitter 101. The control unit 141 outputs, for example, an attenuation amount control signal to the variable optical attenuator 131. The attenuation amount control signal is a signal for controlling an attenuation amount of the variable optical attenuator 131 in such a way that transmission power has a predetermined value. The control unit 141 outputs, to the framer 111, transmission optical power setting information. The transmission optical power setting information is information for issuing an instruction to the framer 111 in such a way as to write (i.e., insert) a value of transmission power in an overhead area of a frame. The control unit 141 may previously store, as data, a relation between an attenuation amount of the variable optical attenuator 131 and transmission power. The relation between an attenuation amount and transmission power can be previously measured. Alternatively, the optical transmitter 101 may include a function of measuring transmission power. In this case, the control unit 141 notifies the framer 111 of a measurement result of the transmission power and thereby, may write a value of the transmission power in an overhead area of a frame. Alternatively, the transmission power may be determined from a value in which power of an optical signal being output from the EO converter 121 at a transmission time of the optical signal is corrected with an attenuation amount of the variable optical attenuator 131 at the transmission time. The control unit 141 can be referred to as the control means.

In this manner, transmission power of the optical signal generated by the optical transmitter 101 is transmitted to the optical receiver 201, by using an overhead area of a transmission signal.

Figure 5:
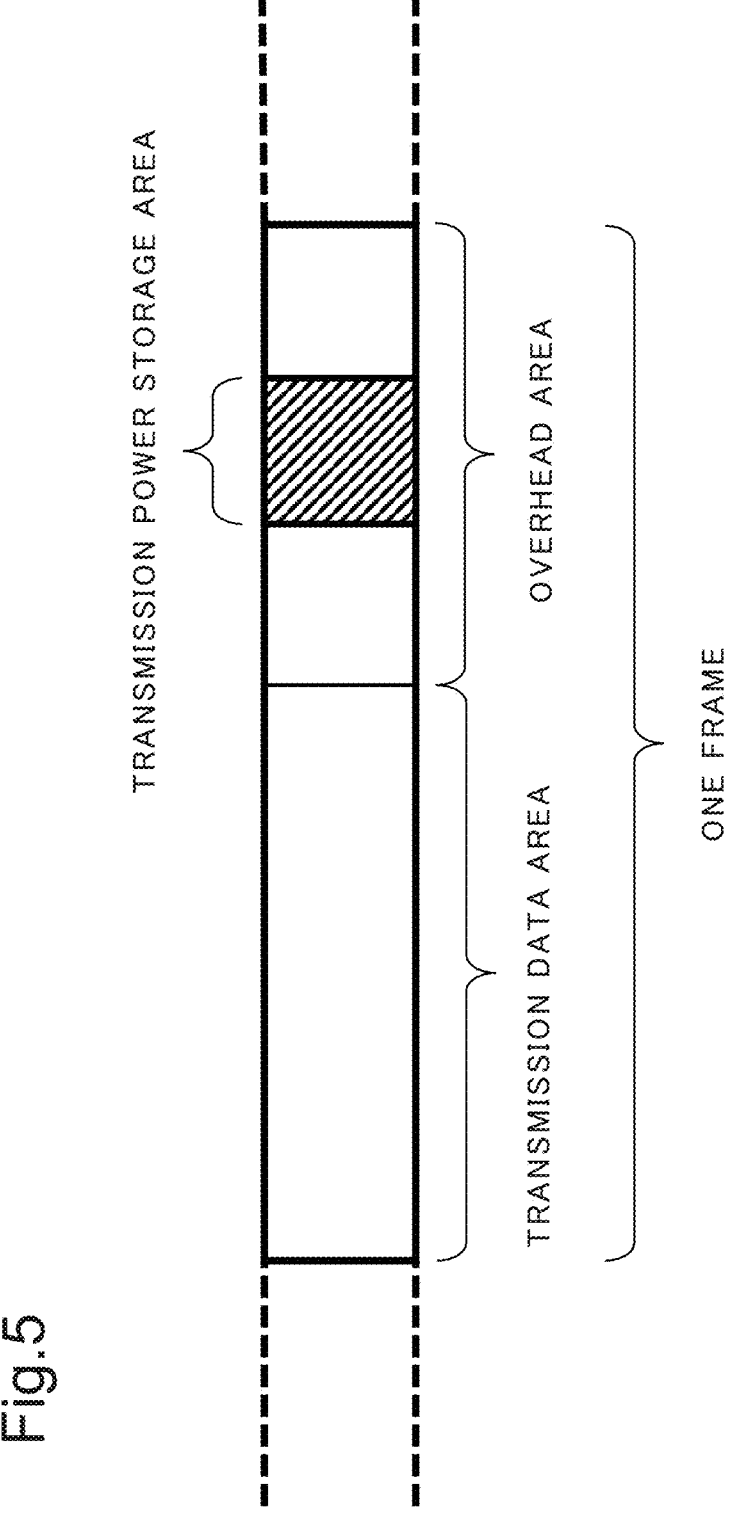
FIG. 5 is a diagram illustrating an example of a configuration of one frame included in a transmission signal.

FIG. 5 is a diagram illustrating an example of a configuration of one frame included in a transmission signal in the optical transmitter 101. The transmission signal is a digital electric signal and is output as continuous frames from the framer 111. Each frame of the transmission signal has a transmission data area and an overhead area. The farmer 111 stores transmission data in the transmission data area and stores overhead data in the overhead area. The overhead data include a monitoring signal, a control signal, and transmission power used in the optical transmission system 2. The transmission power is written, as data, in a transmission power storage area of the overhead area. In this manner, in each frame of a transmission signal, data indicating transmission power of an optical signal are stored. Therefore, the optical receiver 201 extracts transmission power from an overhead area of a frame and thereby, can recognize transmission power of the frame.

Figure 6:
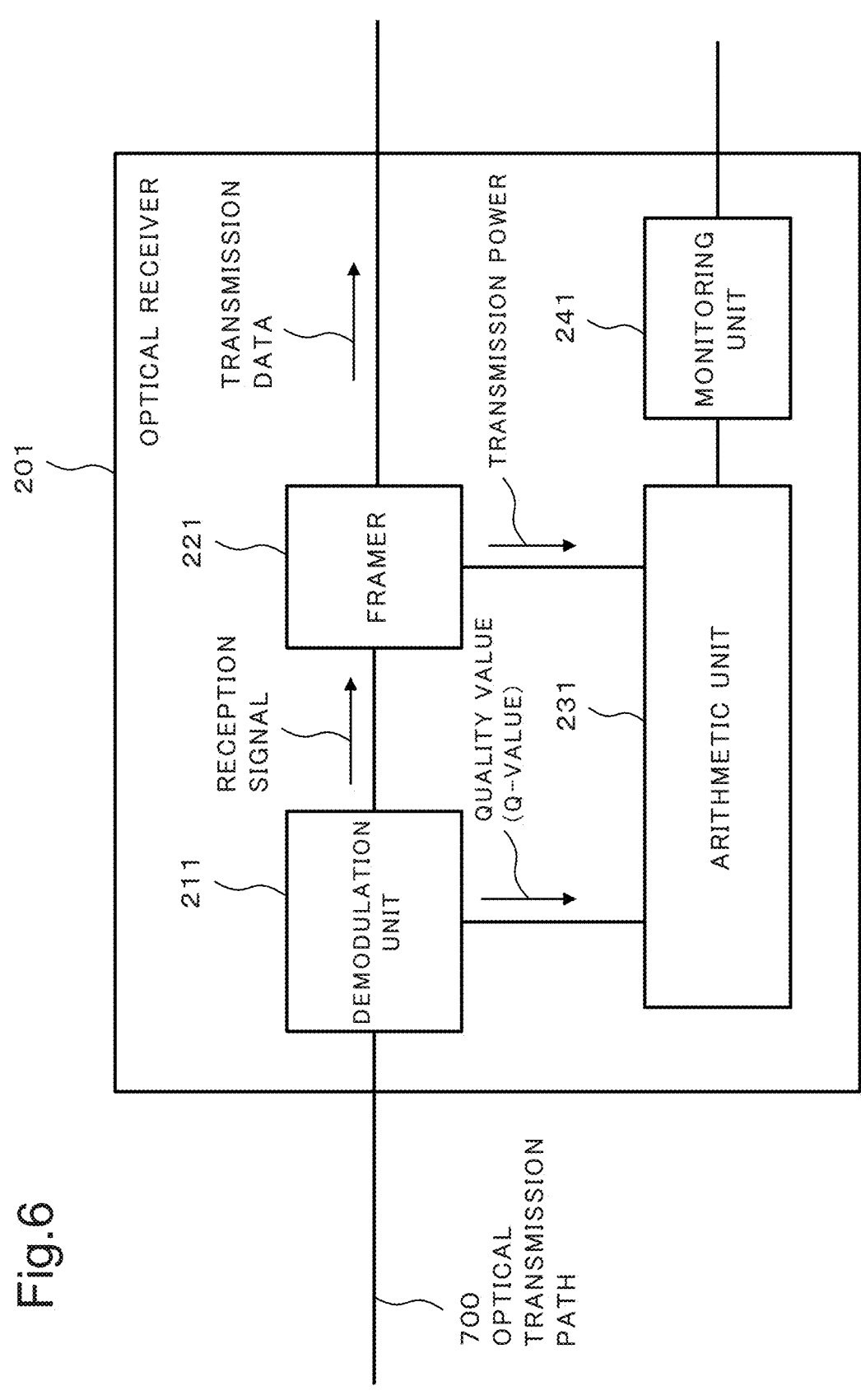
FIG. 6 is a block diagram illustrating a configuration example of an optical receiver.

FIG. 6 is a block diagram illustrating a configuration example of the optical receiver 201 used in the optical transmission system 2. The optical receiver 201 includes a demodulation unit 211, a framer 221, an arithmetic unit 231, and a monitoring unit 241.

The demodulation unit 211, similarly to the demodulation unit 210, demodulates an optical signal transmitted by the optical transmission path 700 and converts the demodulated optical signal to a reception signal being a digital electric signal. The demodulation unit 211 outputs the reception signal to the framer 221. The demodulation unit 211 calculates a quality value indicating quality of a received optical signal and outputs the calculated quality value to the arithmetic unit 231. According to the present example embodiment, a case where as a quality value, a Q-value is used is described.

Transmission power being optical power at a time of transmitting an optical signal received by the optical receiver 201 is stored in an overhead area of a frame as overhead data in the framer 221 of the optical transmitter 201. The framer 221 terminates a frame of the reception signal. In other words, the framer 221 analyzes a frame of the reception signal and extracts each of transmission data and overhead data. Then, the framer 221 acquires transmission power from the overhead data. The transmission power indicates a value of optical power of an optical signal at a time of transmitting a relevant overhead signal. The framer 221 outputs a value of the transmission power to the arithmetic unit 231. The framer 221 is one mode of the extraction unit 220 described according to the first example embodiment.

The arithmetic unit 231 acquires a Q-value from the demodulation unit 211 and acquires transmission power from the framer 221. The arithmetic unit 231 determines, by using the Q-value and a power value stored in a frame used when the Q-value is determined, a change rate of the Q-value to a change in transmission power. The arithmetic unit 231 acquires, from the demodulation unit 211, for example, first optical power P1 and second optical power P2 being different pieces of transmission power, and Q1 being a first Q-value and Q2 being a second Q-value, which are quality values of optical signals when the optical signals are transmitted with pieces of transmission power. A change rate $\Delta Q$ of a quality value to optical power is calculated by using the following equation.

[Math. 1]

$$\Delta Q = (Q2 - Q1)/(P2 - P1) \qquad (1)$$

wherein Q1 may be calculated, in a range where a difference from transmission power P1 in a frame in which Q1 is calculated is sufficiently small, by using transmission power of another frame or a plurality of frames in a reception signal. The same applies to calculation of Q2.

Figure 7:
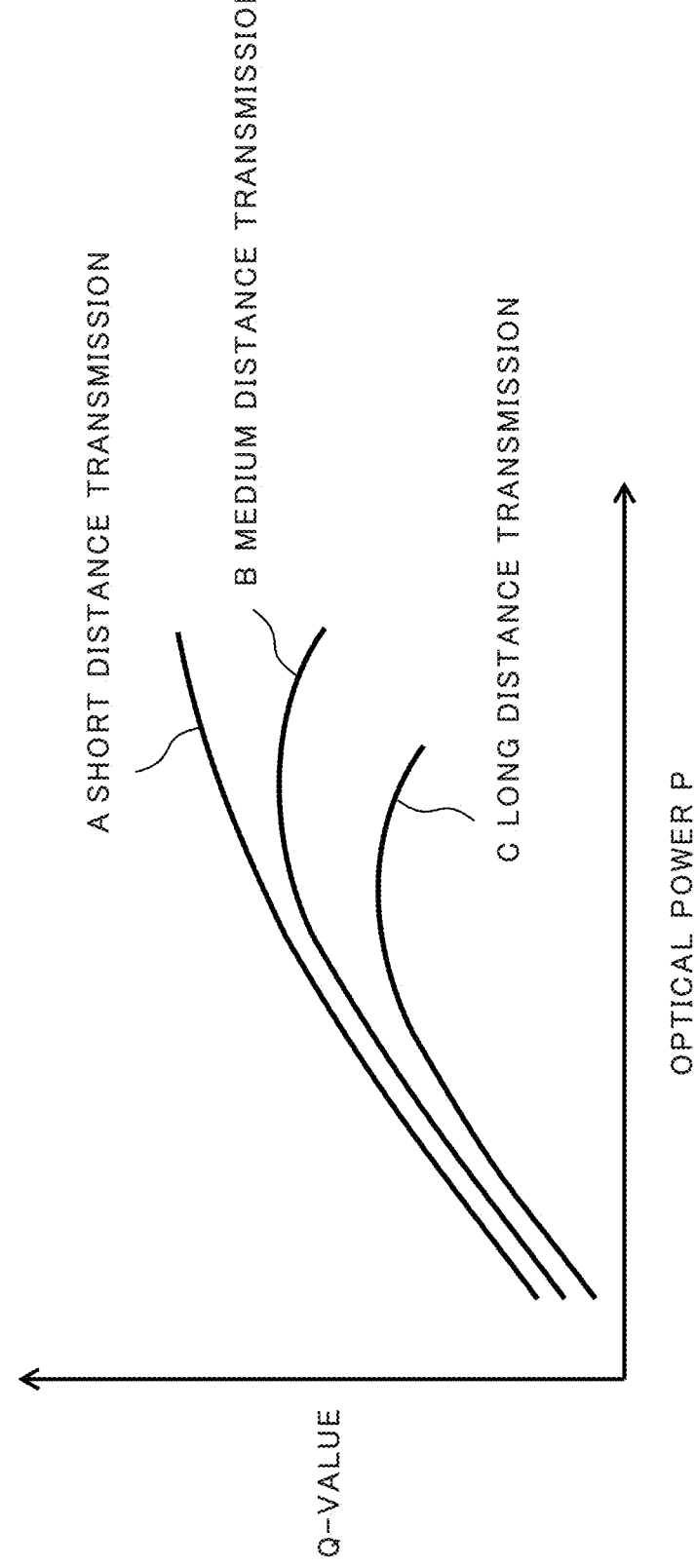
FIG. 7 is a diagram illustrating an example of a relation between optical power and a Q-value.

FIG. 7 is a diagram illustrating an example of a relation between an optical power and a Q-value. Hereinafter, an example of a relation between transmission power P of an optical signal and a Q-value acquired by receiving an optical signal in which transmission power is P is described. A curve A in FIG. 7 indicates an example when a transmission distance of an optical signal is relatively short. In other words, the curve A indicates an example of a relation between optical power and a Q-value when an optical signal transmitted from the optical transmitter 101 is propagated through a relatively-short optical transmission path 700 and received by the optical receiver 201. A length of the optical transmission path 700 in this case is, for example, several meters. When an optical transmission path is short, an influence of a non-linear effect of an optical fiber on an optical signal is small, and therefore a Q-value also increases substantially monotonically, relative to an increase in optical power P.

A curve B in FIG. 7 indicates an example of a case where a transmission distance of an optical signal is a medium range. In other words, the curve B indicates an example of a relation between optical power and a Q-value when an optical signal transmitted from the optical transmitter 101 is transmitted through a medium-distance optical transmission path 700 and received by the optical receiver 201. A length of the optical transmission path 700 in this case is, for example, several kilometers. When an optical transmission path is long to some extent, with an increase in optical power, an influence of a non-linear effect of an optical fiber is larger than in the curve A. In the curve B, with an increase in optical power, a Q-value draws a curve having an upper convex peak.

A curve C in FIG. 7 indicates an example of a long distance transmission case where a transmission distance of an optical signal is further longer than in the curve B. In other words, the curve C indicates an example of a relation between optical power and a Q-value in which an optical signal transmitted from the optical transmitter 101 is transmitted through a long-distance optical transmission path 700 and received by the optical receiver 201. A length of the optical transmission path 700 in this case is, for example, several tens kilometers. In the curve C, with an increase in optical power, an influence of a non-linear effect of an optical fiber is larger than in the curve B. In the curve C, with an increase in optical power, a Q-value has an upper convex peak in power lower than in the curve B.

Figure 8:
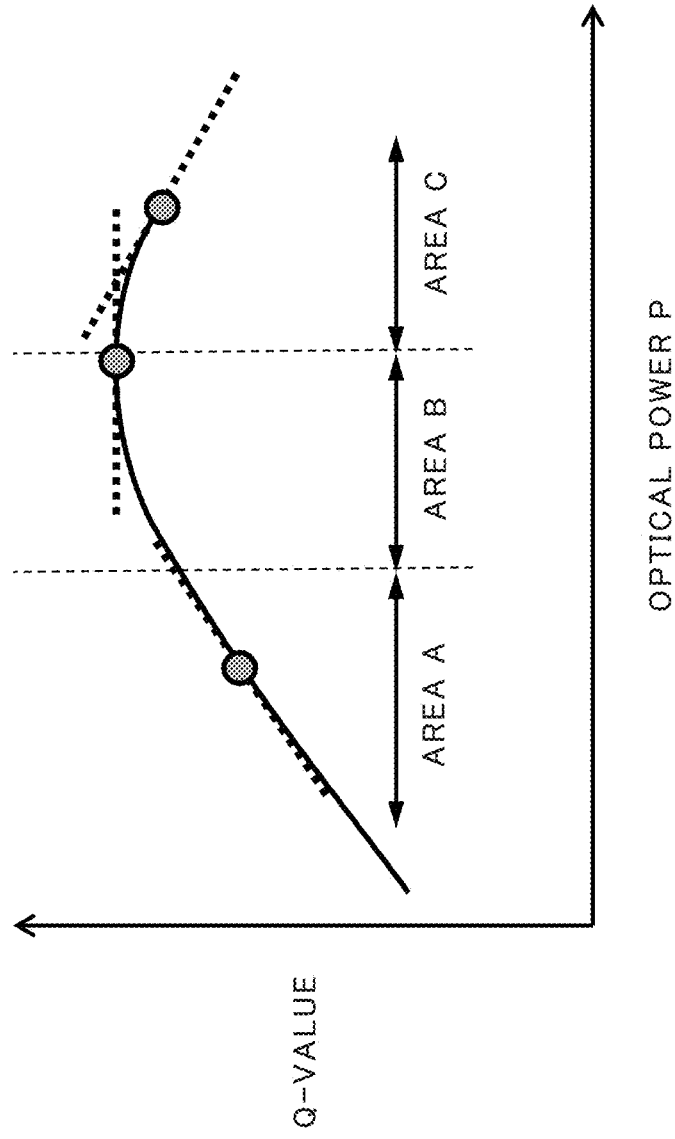
FIG. 8 is a diagram illustrating an example of a change in slope of a tangent of a graph for a Q-value in a case of long distance transmission.

FIG. 8 is a diagram illustrating, by using the curve in FIG. 7 as an example, an example of a change in slope of a tangent of a graph for a Q-value (i.e., a change rate of a Q-value) in a case of long distance transmission. In an area (area A) where optical power is relatively low, with an increase in optical power, a Q-value increases substantially linearly. In an area (area B) where optical power is slightly high, a Q-value increases with an increase in optical power, but an increase rate of the Q-value gradually decreases and finally becomes zero. In other words, in the area B, a slope (i.e., a change rate) of a tangent of a Q-value approaches zero from a positive value with an increase in optical power and a slope of a tangent is zero at a peak of a curve. When optical power further increases, a slope of a tangent of the Q-value has a negative value (area C).

Figure 9:
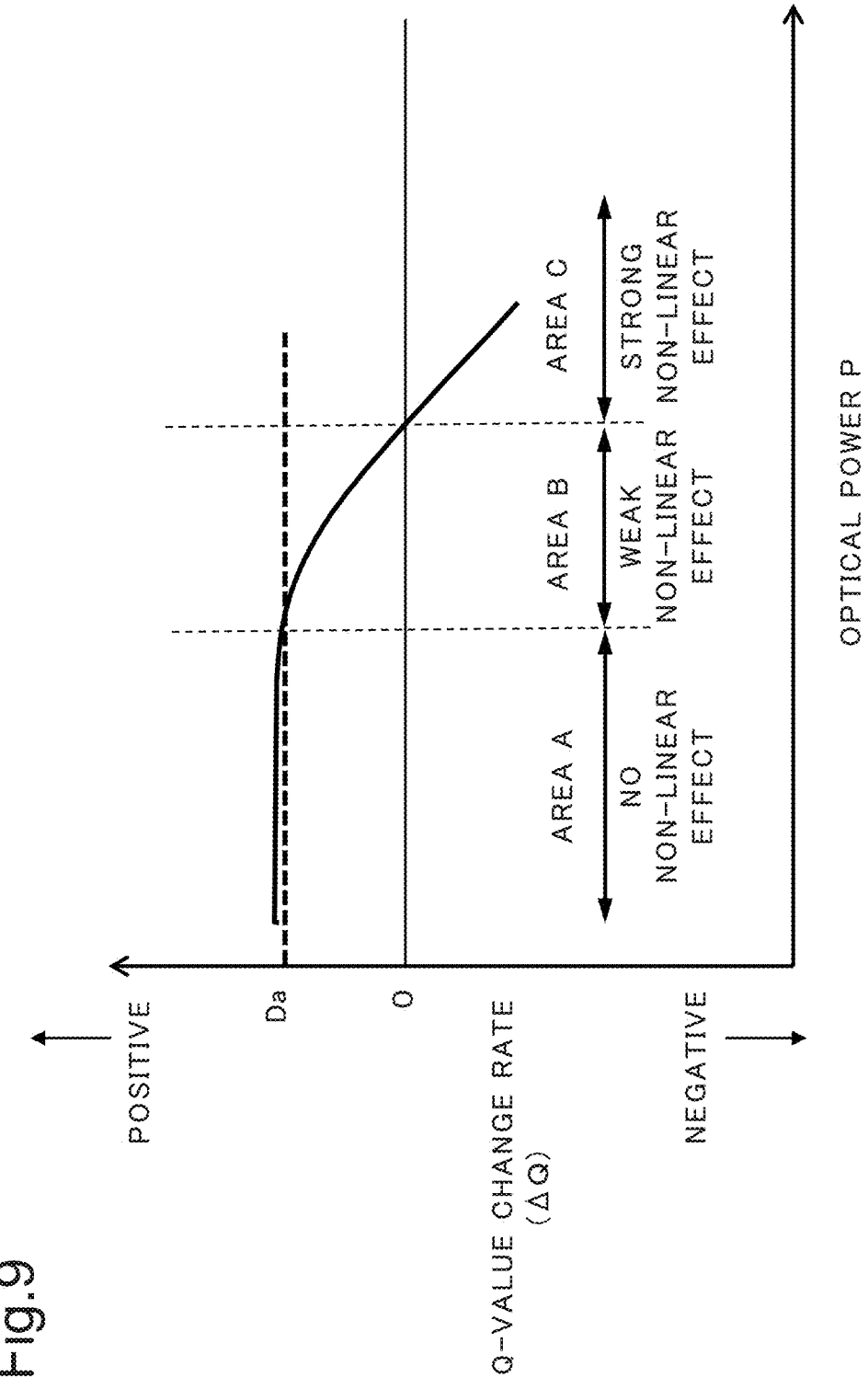
FIG. 9 is a diagram schematically illustrating an example of a change rate of a Q-value to optical power.

FIG. 9 is a diagram schematically illustrating an example of a change rate (slope) of a Q-value to optical power described in FIG. 8. FIG. 9 indicates that in the area A, a change rate of a Q-value is equal to or more than Da and substantially constant and an influence of a non-linear effect of an optical fiber on an optical signal is small. In the area B, a change rate of the Q-value is less than Da due to a non-linear effect and finally becomes zero. In the area B, a non-linear effect of the optical fiber is relatively weak. When optical power further increases, as illustrated in the area C, a change rate of the Q-value has a negative value. In other words, in the area C, due to an influence of a non-linear effect stronger than in the area B, when optical power increases, the Q-value conversely decreases. In this manner, a change rate of the Q-value monotonically decreases as a non-linear effect of the optical fiber on an optical signal increases. Therefore, a change rate of the Q-value is compared with a previously-set threshold, and thereby it is determined whether an optical signal is being affected by a non-linear effect and then a determination result can be notified to another device or a maintenance person. As a change rate of the Q-value for such determination, a calculation result $\Delta Q$ of equation (1) is usable. In other words, by using a change rate $\Delta Q$ of the Q-value and a predetermined threshold, it can be determined whether an optical signal is being affected by a non-linear effect of the optical fiber on the optical transmission path 700.

Figure 10:
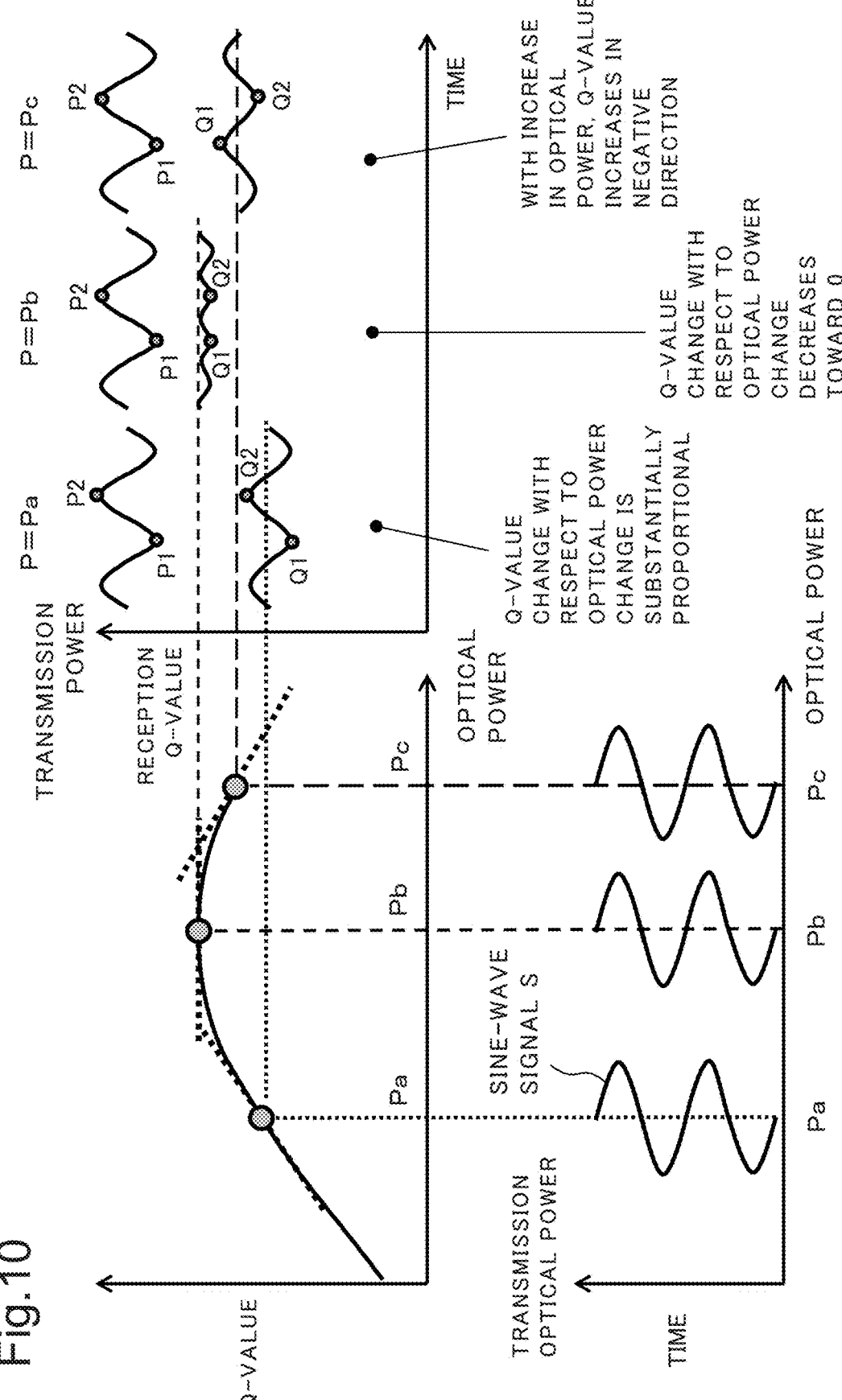
FIG. 10 is a diagram illustrating an example of a relation between a change in transmission power and a change rate of a Q-value.

FIG. 10 is a diagram illustrating an example of a relation between a change in transmission power and a change rate of a Q-value. In FIG. 10, by using the graph of a relation between optical power and a Q-value illustrated in FIG. 8, a procedure of determining a change rate of a Q-value to optical power is described.

The optical transmitter 101 superimposes a dither signal on an optical signal in order to change transmission power of the optical signal. Transmission power of the optical signal is changed by the dither signal. The dither signal may be superimposed on an optical signal by periodically changing an attenuation amount of the variable optical attenuator 131. In this case, the control unit 141 notifies the framer 111 of optical power in which a change in transmission power based on the dither signal is reflected. Thereby, in a transmission power storage area of a frame, a value in which a variation of the transmission power based on the dither signal is reflected is stored as transmission power. The dither signal may be superimposed by amplitude-modulating an optical signal in the EO converter 121.

Hereinafter, a case where as a dither signal, a sine-wave signal is used is described. A frequency and an amplitude of the sine-wave signal are desirably set according to a specification of the optical transmission system 2 in such a way as not to affect transmission quality of an optical signal. The frequency of the sine-wave signal is set, for example, to be sufficiently lower than a frequency of transmission data of an optical signal. A variation width of optical power of an optical signal based on a sine-wave signal (a degree of modulation of an optical signal based on a sine-wave signal) is set to be sufficiently smaller, relative to transmission power.

When in the optical transmitter 101, a sine-wave signal is superimposed as a dither signal, optical power of an optical signal changes depending on a waveform (e.g., a frequency, a phase, and an amplitude) of the sine-wave signal. The optical receiver 201 receives an optical signal in which optical power is varied by the sine-wave signal.

The demodulation unit 211 determines a Q-value of the received optical signal and outputs the determined Q-value to the arithmetic unit 231. The framer 221 terminates a frame of a reception signal and extracts transmission data and a value of transmission power. The transmission data are output to an outside of the optical receiver 201, and the value of the transmission power is output to the arithmetic unit 231.

The arithmetic unit 231 associates the Q-value with the transmission power and records, as Q-value data, the associated Q-value and transmission power in a storage device such as a semiconductor memory included in the arithmetic unit 231. The arithmetic unit 231 calculates, as described above, a change rate $\Delta Q$ of a quality value to optical power, by using the Q-value.

FIG. 10 illustrates an example of a relation between transmission power and a Q-value when average transmission power (transmission power in which power variations based on a dither signal are averaged) is Pa, Pb, and Pc. In an optical signal modulated by a dither signal S, transmission power periodically changes, and therefore a Q-value also changes depending on a change of the transmission power. When in certain average transmission power, a minimum value of transmission power based on a dither signal is P1 and a maximum value of the transmission power is P2, the arithmetic unit 231 acquires a Q-value in the transmission power P1 as Q1 and a Q-value in the transmission power P2 as Q2, from data of the Q-values acquired from the demodulation unit 211. The arithmetic unit 231 determines a change rate $\Delta Q$ between the Q-values from equation (1). The change rate $\Delta Q$ between the Q-values determined by the arithmetic unit 231 is input to the monitoring unit 241.

When an optical signal is transmitted based on transmission power P=Pa (i.e., an area recognized as being not affected by a non-linear effect), an increase of a Q-value is larger than an increase of transmission power. The monitoring unit 241 determines, when a change rate of a Q-value indicated by $\Delta Q$ is present in the area A in FIG. 9, that an optical signal is not being affected by a non-linear effect. For example, the monitoring unit 241 may determine, when Da in FIG. 9 is a first threshold and $\Delta Q$ is equal to or more than Da, that an optical signal is not being affected by a non-linear effect. A lower limit of slope of a Q-value in an area where Da is a positive value and the Q-value linearly increases relative to an increase in transmission power may be set as Da. Da may be determined, from a relation thereof to quality of an actual optical signal in a change rate of an actually-measured Q-value, as a value which can be determined as being not affected by a non-linear effect. In this manner, Da is a value indicating a boundary between the area A and the area B in association with $\Delta Q$.

When an optical signal is transmitted under a condition of the area B (i.e., an area where a weak non-linear effect is present), an increase rate of a Q-value to an increase amount of transmission power is smaller than in the area A and finally becomes zero. When the transmission power is further higher, an increase rate of the Q-value becomes a negative value (area C). The monitoring unit 241 may determine, when a slope of a Q-value indicated by $\Delta Q$ is present in the area B of FIG. 9, that an optical signal is being affected by a non-linear effect. In other words, the monitoring unit 241 may determine, when $\Delta Q$ falls within a range of $0 \leq \Delta Q < Da$, that an optical signal is being affected by a non-linear effect. The monitoring unit 241 may determine, when the slope of the Q-value indicated by $\Delta Q$ is present in the area C of FIG. 9, that an optical signal is being strongly affected by a non-linear effect. In the area C, $\Delta Q$ is a negative value. In other words, the monitoring unit 241 may determine, when $\Delta Q$ is a negative value, that an optical signal is being strongly affected by a non-linear effect. A value of $\Delta Q$ being a boundary between the area B and the area C is not limited to 0. A threshold for determining whether an optical signal is being very strongly affected by a non-linear effect may be a value other than 0.

The optical receiver 201 may notify, at any time, the optical transmitter 101 of a determination result for an influence of a non-linear effect on an optical signal, by using a path of a monitoring control signal, or the like. The monitoring unit 241 notifies, for example, when a change rate $\Delta Q$ of a Q-value is equal to or more than Da (first threshold) being a positive value, the optical transmitter 101 of a first notification signal indicating that an optical signal is not being affected by a non-linear phenomenon. The monitoring unit 241 notifies, when $\Delta Q$ is less than the first threshold and equal to or more than 0, the optical transmitter 101 of a second notification signal indicating that an optical signal is being weakly affected by a non-linear phenomenon. Further, the monitoring unit 241 notifies, when $\Delta Q$ is negative, the optical transmitter 101 of a third notification signal indicating that an optical signal is being strongly affected by a non-linear phenomenon. The monitoring unit 241 may notify the optical transmitter 101 of at least one of the first to third notification signals.

The optical transmitter 101 having received a determination result performs an operation according to the determination result. For example, when the optical transmitter 101 receives the second notification signal, the optical transmitter 101 may issue a warning. The warning notifies a maintenance person of a matter that since transmission power of an optical signal is high, a Q-value decreases with a further increase of the transmission power (i.e., the Q-value transitions from the area B to the area C in FIG. 8). When the optical transmitter 101 receives the third notification signal, the optical transmitter 101 may decrease transmission power of an optical signal within a range allowable in the optical transmission system 2. The optical transmitter 101 may decrease transmission power until receiving the first or second notification signal. Further, the optical transmitter 101 may increase, when the first or second notification signal is received, transmission power within a range where the third notification signal is not notified from the optical receiver 201.

The optical transmission system 2 including such a configuration can detect occurrence of an influence due to a non-linear effect of an optical fiber. The reason is that the optical receiver 201 compares a change amount of quality information with respect to a change of transmission power with a threshold and thereby, determines presence/absence of an influence of a non-linear effect. According to the present example embodiment, a change rate $\Delta Q$ of a Q-value is compared with a plurality of thresholds (Da and 0). Therefore, the optical receiver 201 can determine, in three or more stages, a degree of influence of a non-linear effect.

Further, the optical receiver 201 notifies the optical transmitter 101 of a determination result and the optical transmitter 101 controls transmission power of an optical signal according to the determination result, and thereby the optical transmission system 2 can reduce an influence of a non-linear phenomenon on the optical signal.

Third Example Embodiment

A wavelength division multiplexed (WDM) transmission system in which a WDM signal acquired by wavelength-multiplexing a plurality of optical signals is transmitted has been put into practical use. In the WDM transmission system, generally, a degree of change of signal quality due to a non-linear effect of an optical fiber does not depend on total power of the WDM signal but depends on power per wavelength of each optical signal. Therefore, when optical power of a certain optical signal increases, signal quality of a WDM signal decreases due to a non-linear effect of an optical fiber and then, errors of the WDM signal may increase. Therefore, at a time of transmitting a WDM signal, it is desirable that signal quality of optical signals is monitored, and thereby presence/absence of an influence of a non-linear effect can be detected for each optical signal.

Figure 11:
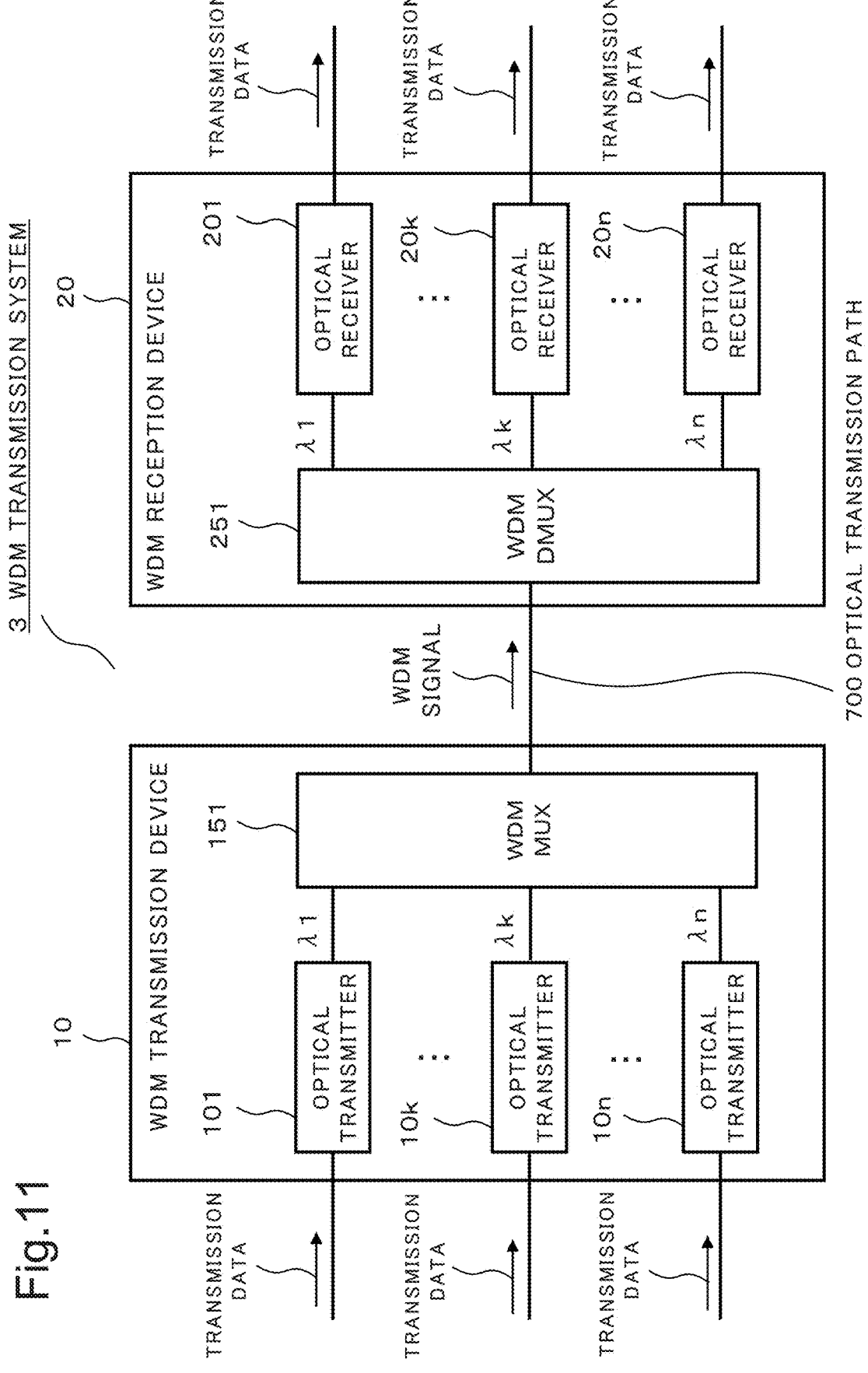
FIG. 11 is a block diagram illustrating a configuration example of a WDM transmission system.

FIG. 11 is a block diagram illustrating a configuration example of a WDM transmission system 3 according to a third example embodiment. In the WDM transmission system 3, a WDM transmission device 10 outputs a WDM signal to an optical transmission path 700 and a WDM reception device 20 receives the WDM signal from the optical transmission path 700. The WDM signal includes optical signals of a plurality of channels different in wavelength from each other.

The WDM transmission device 10 includes n optical transmitters 101 to 10$n$ (n is a natural number) and a wavelength multiplexing unit (WDM MUX) 151.

The optical transmitters 101 to 10$n$ each convert each of pieces of transmission data different from each other to an optical signal. An optical transmitter 10$k$ (1≤k≤n) transmits an optical signal of a wavelength λk as a kth channel. The optical transmitters 101 to 10$n$ each include a configuration and a function similar to the optical transmitter 101 described in the second example embodiment. However, wavelengths λ1 to λn of optical signals to be transmitted by the optical transmitters 101 to 10$n$ are not overlapped with each other.

Optical signals being output by the optical transmitters 101 to 10$n$ are wavelength-multiplexed by a wavelength multiplexing unit 151. The wavelength multiplexing unit is an optical multiplexer and multiplexes n optical signals different in wavelength from each other. As the wavelength multiplexing unit 151, an arrayed waveguide grating (AWG), a wavelength selective switch (WSS), or an n×1 optical star coupler is usable.

The WDM reception device 20 includes a wavelength demultiplexing unit (WDM DMUX) 251 and n optical receivers 201 to 20$n$. The wavelength demultiplexing unit 251 demultiplexes, with respect to each wavelength, a WDM signal being input from the optical transmission path 700 and outputs, as n-channel optical signals, the demultiplexed WDM signal to the optical receivers 201 to 20$n$. As the wavelength demultiplexing unit 251, an AWG or a WSS is usable. Each of the optical receivers 201 to 20$n$ includes a configuration and a function similar to the optical receiver 201 according to the second example embodiment. In other words, an optical receiver 20$k$ demodulates an optical signal of a channel k. Demodulated transmission data are output on an outside of the WDM reception device 20 with respect to each channel. The optical receivers 201 to 20$n$ each determine a change rate ΔQ of a Q-value for an optical signal of a received channel and determine whether the received optical signal is being affected by a non-linear phenomenon.

The WDM transmission system 3 including such a configuration can detect occurrence of an influence on quality of an optical signal due to a non-linear effect of the optical transmission path 700. The WDM transmission system 3 can determine whether an optical signal is being affected by a non-linear phenomenon due to the optical transmission path 700 with respect to each channel of a WDM signal. Therefore, the WDM transmission system 3 can recognize in detail an influence on quality of an optical signal due to a non-linear phenomenon.

The optical receiver 20$k$ notifies the optical transmitter 10$k$ of a determination result for an influence of a non-linear phenomenon, and thereby the optical transmitter 10$k$ may control, based on the notified determination result, transmission power of an optical signal. With such a configuration, the WDM transmission system 3 can reduce quality deterioration of a WDM signal due to an influence of a non-linear phenomenon.

First Modified Example According to Third Example Embodiment

In the WDM transmission system 3, when transmission power of an optical signal in any channel is changed in a case where the number of wavelengths of a WDM signal is small, the change may affect power of another channel. In order to avoid such an influence, the WDM transmission device 10 may control, in such a way that average transmission power of two channels selected from a plurality of channels is constant, transmission power of the two channels.

Second Modified Example of Third Example Embodiment

A wavelength in which optical power is changed by a dither signal may be only one wavelength (i.e., one channel). For example, the WDM transmission device 10 superimposes a dither signal on only an optical signal of a wavelength of a certain channel m (1≤m≤n), and in contrast, the WDM reception device 20 may monitor a Q-value or an error of every channel of a WDM signal. In such a configuration, when at a timing of an increase in transmission power of the channel m, a Q-value decreases or errors increase in channels other than the channel m, it is supposed that interference is occurring between channels of a WDM signal.

The previous description of embodiments is provided to enable a person skilled in the art to make and use the present disclosure. Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed disclosure even if the claims are amended during prosecution.

For example, the optical receiver, the optical transmission system, and the optical transmitter described in the example embodiments each disclose even example embodiments of an optical reception method, an optical transport method, and an optical transmission method.

Configurations described in the example embodiments are not necessarily exclusive to each other. Operations and advantageous effects according to the present disclosure may be achieved by a configuration acquired by combining the whole or part of the above-described example embodiments.

A function and a procedure according to the example embodiments described above may be achieved by a program executed by a central processing unit (CPU) included in the control unit 141 and the arithmetic units 230 and 231. The program is recorded in a fixed, non-transitory recording medium. As the recording medium, a semiconductor memory or a fixed magnetic disk is usable without limitation thereto. The CPU is a computer included, for example, in the control unit and the arithmetic unit.

The whole or part of the example embodiments according to the present disclosure can be described as, but not limited to, the following supplementary notes.

(Supplementary Note 1)

An optical receiver including:

a demodulation means for demodulating a received optical signal and outputting a reception signal, and calculating a quality value indicating quality of the optical signal;

an extraction means for extracting, from the reception signal, transmission power being a value indicating optical power at a time of transmitting the optical signal;

an arithmetic means for determining a change rate of the quality value to the transmission power; and a monitoring means for determining, based on a comparison result between the change rate and a predetermined threshold, an influence of a non-linear effect in the optical signal.

(Supplementary Note 2)

The optical receiver according to supplementary note 1, wherein the change rate is a ratio of a difference between a first quality value and a second quality value to a difference between first transmission power and second transmission power, where the first transmission power and the second transmission power are the transmission power different from each other, the first quality value being the quality value in the first transmission power, and the second quality value being the quality value in the second transmission power.

(Supplementary Note 3)

The optical receiver according to supplementary note 1 or 2, wherein the optical signal is superimposed with a dither signal for varying the transmission power.

(Supplementary Note 4)

The optical receiver according to any one of supplementary notes 1 to 3, wherein the monitoring means outputs at least one of a first notification signal indicating that the optical signal is not affected by a non-linear phenomenon when the change rate is equal to or more than a first threshold being a positive value, a second notification signal indicating that the optical signal is weakly affected by a non-linear phenomenon when the change rate is less than the first threshold and equal to or more than 0, and a third notification signal indicating that the optical signal is strongly affected by a non-linear phenomenon when the change rate is negative.

(Supplementary Note 5)

The optical receiver according to any one of supplementary notes 1 to 4, wherein the quality value is a Q-value.

(Supplementary Note 6)

The optical receiver according to any one of supplementary notes 1 to 5, wherein the transmission power is inserted in a frame of data transmitted by the optical signal and the transmission power inserted in the frame indicates optical power of the optical signal at a time of transmitting the frame.

(Supplementary Note 7)

An optical transmission system including:

an optical transmitter including a transmission signal generation means for outputting a transmission signal being an electric signal including transmission power, an optical modulation means for performing modulation by the transmission signal and outputting the optical signal, an optical intensity adjustment means for adjusting intensity of the optical signal, and a control means for outputting the transmission power to the transmission signal generation means and controlling the optical intensity adjustment means in such a way that power of the optical signal being output from the optical intensity adjustment means is the transmission power;

an optical transmission path that transmits the optical signal being output from the optical intensity adjustment means to the optical receiver; and the optical receiver according to supplementary note 4, further including a function of receiving the optical signal propagating through the optical transmission path and transmitting, to the optical transmitter, at least one of the first, the second, and the third notification signals.

(Supplementary Note 8)

The optical transmission system according to supplementary note 7, wherein the optical transmitter adjusts the transmission power according to at least one of the first, the second, and the third notification signals.

(Supplementary Note 9)

The optical transmission system according to supplementary note 7 or 8, wherein the optical transmitter outputs a warning when receiving the second notification signal from the optical receiver.

(Supplementary Note 10)

The optical transmission system according to any one of supplementary notes 7 to 9, wherein the optical transmitter decreases the transmission power when receiving the third notification signal from the optical receiver.

(Supplementary Note 11)

An optical transmitter including:

a transmission signal generation means for outputting a transmission signal being an electric signal including transmission power being a value indicating power at a time of transmitting an optical signal;

an optical modulation means for modulating the transmission signal and outputting the optical signal;

an optical intensity adjustment means for adjusting intensity of the optical signal; and a control means for outputting the transmission power to the transmission signal generation means and controlling the optical intensity adjustment means in such a way that power of the optical signal being output from the optical intensity adjustment means is the transmission power.

15

(Supplementary Note 12)

The optical transmitter according to supplementary note 11, wherein the optical intensity adjustment means superimposes the optical signal with a dither signal for varying the transmission power.

(Supplementary Note 13)

The optical transmitter according to supplementary note 11 or 12, wherein the control means adjusts the transmission power according to a notification relating to an influence of a non-linear phenomenon on the optical signal, the notification being notified from an optical receiver having received the optical signal.

(Supplementary Note 14)

An optical reception method including:

demodulating a received optical signal and outputting a reception signal;

calculating a quality value indicating quality of the optical signal;

extracting, from the reception signal, transmission power being a value indicating optical power at a time of transmitting the optical signal;

determining a change rate of the quality value to the transmission power; and determining, based on a comparison result between the change rate and a predetermined threshold, an influence of a non-linear effect in the optical signal.

(Supplementary Note 15)

The optical reception method according to supplementary note 14, further including determining the change rate as a ratio of a difference between a first quality value and a second quality value to a difference between first transmission power and second transmission power being different pieces of the transmission power, the first quality value being the quality value in the first transmission power, the second quality value being the quality value in the second transmission power.

(Supplementary note 16)

An optical transmission method including:

outputting, from a transmission signal generation means, a transmission signal being an electric signal including transmission power being a value indicating power at a time of transmitting an optical signal;

modulating the transmission signal and outputting the optical signal;

outputting the transmission power to the transmission signal generation means; and adjusting power of the optical signal in such a way that power of the optical signal is the transmission power.

(Supplementary Note 17)

The optical transmission method according to supplementary note 16, further including adjusting the transmission power according to a notification relating to an influence of a non-linear phenomenon on the optical signal, the notification being notified from an optical receiver having received the optical signal.

REFERENCE SIGNS LIST 1, 2 Optical transmission system
3 WDM transmission system
10 WDM transmission device
20 WDM reception device
100, 101 Optical transmitter
101 to 10n Optical transmitter
111 Framer
121 EO converter
131 Variable optical attenuator

16

141 Control unit
151 Wavelength multiplexing unit (WDM MUX)
151 Wavelength multiplexing unit
200, 201 Optical receiver
201 to 20n Optical receiver
210, 211 Demodulation unit
220 Extraction unit
221 Framer
230, 231 Arithmetic unit
240, 241 Monitoring unit
251 Wavelength demultiplexing unit (WDM DMUX)
700 Optical transmission path

The invention claimed is:

1. An optical receiver comprising:

a demodulation unit configured to demodulate an optical signal, output a reception signal, and calculate quality values each indicating a quality for each of optical signals having different transmission powers;

an extracting unit configured to extract, from the reception signal demodulated from the optical signal, transmission powers being values each indicating an optical power at a time of transmitting the optical signal at different transmission powers;

an arithmetic unit configured to determine a change rate of the quality values to the transmission powers; and a monitoring unit configured to determine, based on a comparison result between the change rate and a predetermined threshold, an influence of a non-linear effect in the optical signal.

2. The optical receiver according to claim 1, wherein:

the change rate is a ratio of a difference between a first quality value and a second quality value to a difference between first transmission power and second transmission power, where the first transmission power and the second transmission power are among the transmission powers different from each other, wherein the first quality value is a quality value at the first transmission power, and wherein the second quality value is a quality value at the second transmission power.

3. The optical receiver according to claim 1, wherein the optical signal is superimposed with a dither signal for varying the transmission powers.

4. The optical receiver according to claim 2, wherein the optical signal is superimposed with a dither signal for varying the transmission powers.

5. The optical receiver according to claim 1, wherein the monitoring unit outputs at least one of:

a first notification signal indicating that the optical signal is not affected by a non-linear phenomenon when the change rate is equal to or more than a first threshold being a positive value;

a second notification signal indicating that the optical signal is weakly affected by a non-linear phenomenon when the change rate is less than the first threshold and equal to or more than 0; and a third notification signal indicating that the optical signal is strongly affected by a non-linear phenomenon when the change rate is negative.

6. The optical receiver according to claim 2, wherein the monitoring unit outputs at least one of:

a first notification signal indicating that the optical signal is not affected by a non-linear phenomenon when the change rate is equal to or more than a first threshold being a positive value;

a second notification signal indicating that the optical signal is weakly affected by a non-linear phenomenon when the change rate is less than the first threshold and equal to or more than 0; and a third notification signal indicating that the optical signal is strongly affected by a non-linear phenomenon when the change rate is negative.

7. The optical receiver according to claim 1, wherein the quality value is a Q-value.

8. The optical receiver according to claim 2, wherein the quality value is a Q-value.

9. The optical receiver according to claim 1, wherein each of the transmission powers is inserted in a frame of data transmitted by the optical signal and each of the transmission powers inserted in the frame indicates an optical power of the optical signal at a time of transmitting the frame.

10. The optical receiver according to claim 2, wherein each of the transmission powers is inserted in a frame of data transmitted by the optical signal and each of the transmission powers inserted in the frame indicates an optical power of the optical signal at a time of transmitting the frame.

11. An optical reception method comprising:

demodulating an optical signal, output a reception signal, and calculate quality values each indicating a quality for each of optical signals having different transmission powers;

extracting, from the reception signal demodulated from the optical signal, transmission powers being values each indicating an optical power at a time of transmitting the optical signal at different transmission powers;

determining a change rate of the quality values to the transmission powers; and determining, based on a comparison result between the change rate and a predetermined threshold, an influence of a non-linear effect in the optical signal.

12. The optical reception method according to claim 11, further comprising:

determining the change rate as a ratio of a difference between a first quality value and a second quality value to a difference between first transmission power and second transmission power, wherein the first transmission power and the second transmission power are among the transmission powers different from each other, wherein the first quality value is a quality value at the first transmission power, wherein the second quality value is a quality value at the second transmission power.

\* \* \* \* \*